(12) United States Patent
Waeckerle et al.

(10) Patent No.: US 8,808,468 B2
(45) Date of Patent: Aug. 19, 2014

(54) FE—SI—LA ALLOY HAVING EXCELLENT MAGNETO-CALORIC PROPERTIES

(75) Inventors: Thierry Waeckerle, Nevers (FR); Herve Fraisse, Saint Eloi (FR); Mohamed Balli, Grenoble (FR); Patricia De Rango, Gieres (FR); Daniel Fruchart, Echirolles (FR); Damien Gignoux, La Tronche (FR); Salvatore Miraglia, Grenoble (FR); Mariana Rosca, Grenoble (FR); Miguel Jose Artigas Alava, Saragossa (ES)

(73) Assignee: Aperam Alloys Imphy, Saint Denis (FR)

( * ) Notice: Subject to any disclaimer, the term of this patent is extended or adjusted under 35 U.S.C. 154(b) by 880 days.

(21) Appl. No.: 12/747,657

(22) PCT Filed: Dec. 15, 2008

(86) PCT No.: PCT/FR2008/001737
§ 371 (c)(1),
(2), (4) Date: Oct. 7, 2010

(87) PCT Pub. No.: WO2009/103889
PCT Pub. Date: Aug. 27, 2009

(65) Prior Publication Data
US 2011/0020661 A1    Jan. 27, 2011

(30) Foreign Application Priority Data
Dec. 14, 2007 (EP) .................. 07291522

(51) Int. Cl.
*B22F 9/04* (2006.01)
*B22F 9/08* (2006.01)
*H01F 1/055* (2006.01)
*H01F 1/20* (2006.01)

(52) U.S. Cl.
USPC ............. 148/105; 148/301; 75/338; 75/348; 75/352

(58) Field of Classification Search
None
See application file for complete search history.

(56) References Cited

U.S. PATENT DOCUMENTS

| | | | |
|---|---|---|---|
| 6,676,772 B2 * | 1/2004 | Saito et al. | 148/301 |
| 7,063,754 B2 * | 6/2006 | Fukamichi et al. | 148/301 |
| 2006/0076084 A1 * | 4/2006 | Nakajima | 148/101 |
| 2006/0231163 A1 * | 10/2006 | Hirosawa et al. | 148/105 |
| 2009/0194202 A1 * | 8/2009 | Tanigawa | 148/217 |

FOREIGN PATENT DOCUMENTS

| | | |
|---|---|---|
| EP | 1 867 744 | 12/2007 |
| JP | 2006 283074 | 10/2006 |
| WO | 2006 107042 | 10/2006 |

OTHER PUBLICATIONS

Chen, Y.-F., et al., "Magnetism and magnetic entropy change of $LaFe_{11.6}Si_{1.4}C_x$ (x=0-0.6) interstitial compounds," Journal of Applied Physics, vol. 93, No. 2, pp. 1323-1325, (Jan. 15, 2003).
International Search Report issued Jul. 6, 2009 in PCT/FR08/001737 filed Dec. 15, 2008.

* cited by examiner

*Primary Examiner* — George Wyszomierski
(74) *Attorney, Agent, or Firm* — Davidson, Davidson & Kappel, LLC

(57) ABSTRACT

The invention relates to a Fe—Si—La alloy having the atomic composition:

$$(La_{1-a-a'}Mm_aTR_{a'})_1[(Fe_{1-b-b'}Co_bM_{b'})_{1-x}(Si_{1-c}X_c)_x]_{13}$$
$$(C_dN_eH_{1-d-e})_y(R)_z(I)_f$$

Mm representing a mixture of lanthanum, cerium, neodymium and praseodynium in the weight proportion of 22 to 26% La, 48 to 53% Ce, 17 to 20% Nd and 5 to 7% Pr, the said mixture possibly comprising up to 1% by weight of impurities, TR representing one or more elements of the rare earth family other than lanthanum, M representing one or more type d transition elements of the 3d, 4d and 5d layers X representing a metalloid element selected from Ge, Al, B, Ga and In R representing one or more elements selected from Al, Ca, Mg, K and Na, I representing one or two elements selected from O and S, with:

$0 \leq a < 0.5$ and $0 \leq a' < 0.2$ $0 \leq b \leq 0.2$ and $0 \leq b' < 0.4$ $0 \leq c \leq 0.5$ and $0 \leq d \leq 1$ $0 \leq e \leq 1$ and $f \leq 0.1$ $0.09 \leq x \leq 0.13$ and $0.002 \leq y \leq 4$ $0.0001 \leq z \leq 0.01$ the subscripts b, d, e, x and y being such that the alloy further satisfies the following condition:

$$6.143b(13(1-x))+4.437y[1-0.0614(d+e)] \geq 1 \qquad \text{Eq.1}$$

$$d*y \geq 0.005 \qquad \text{Eq.2}$$

It also relates to a powder of this alloy or to a mixture of these alloys and the method of fabrication.

22 Claims, 3 Drawing Sheets

FE—SI—LA ALLOY HAVING EXCELLENT MAGNETO-CALORIC PROPERTIES

The present invention relates to a Fe—Si—La alloy having excellent magnetocaloric properties, more particularly intended for fabricating refrigerating elements, but not necessarily being limited thereto.

A magnetocaloric material is a magnetic material which reacts to the pull of an external magnetic field by changing its level of magnetic entropy. This variation in entropy $\Delta S_m$ is transferred internally to the atomic lattice of this material, which converts it to an increased or decreased agitation and hence to a heating or cooling of the material.

The variation in entropy occurs around the transition temperature $T_t$, corresponding to the Curie temperature for ferromagnetic compounds. The variation in entropy $\Delta S_m$ produced at a temperature T under the application of a field H is obtained by using networks of magnetization curves M(T, H) around the transition temperature $T_t$ according to:

$$\Delta S_m = \int_0^H \left(\frac{\delta M}{\delta T}\right) \cdot dH$$

This characteristic $\Delta S_m(T)$ is quantified in two quantities: the maximum amplitude $\Delta S_{max}$ and the half-width at mid-height $\Delta T_{LMH}$. It also serves to calculate the cooling capacity of the material RCP=$\Delta T_{LMH} \cdot \Delta S_{max}$.

The positive or negative heat generated can then be transferred to a hot or cold source by using a heat transfer fluid in alternate contact with the material of the magnetocaloric material during the part of the magnetization or demagnetization cycle.

In this way, the equivalent of a cycle of a conventional heat engine, but with neither atmospheric pollutant, nor noise or vibrations, and above all, with a significantly higher energy efficiency than that of the Peltier effect or of a conventional thermodynamic cycle.

High magnetocaloric power materials are known, based on the cubic compound having the formula $La(Fe_{1-x}Si_x)_{13}$ where x is preferably between 0 and 2, and of which the transition temperature is generally close to 200K. In this formula, the lanthanum may be partially substituted by another rare earth element, the iron partially substituted by other transition metals such as, for example, Cr, Mn, Co, Ni, and the silicon partially substituted by p electron elements such as for example Al, Ga, Ge, etc. These alloys have very pronounced magnetic transitions in the neighbourhood of the Curie temperature accompanied by a wide variation in magnetic entropy, thereby producing a giant magnetocaloric effect. For example, under a magnetic field of 2 Tesla, the magnetic entropy variation in the alloy $La(Fe_{0.9}Si_{0.1})_{13}$ is equal to 24 J/Kg·K at 190K. They nevertheless have the drawback of manifesting this effect at low temperature only (200K). For applications in the neighbourhood of ambient temperature, it is impossible to use these materials as refrigerants because their Curie temperature is too low.

To obtain a magnetic refrigeration around ambient temperature, the efficient prior art materials are in particular MnAs and certain compounds containing Ta+Hf. However, arsenic is a highly toxic element which should be avoided, and tantalum and hafnium are difficult to produce.

A need therefore exists for a material not containing elements that are dangerous to touch or inhale during their production, which has a transition temperature $T_{tr}$ in a range of service values from −50° C. to +70° C., thus corresponding to the large majority of current or future cases of refrigeration.

Since magnetic fields having an intensity of 0.5 at 2 T can easily be obtained with present-day magnets, this material must also have a high magnetocaloric power such that $\Delta S_{max}>1$ J/kg·K and preferably $\Delta S_{max}>3$ J/kg·K, under an applied magnetic field not exceeding 2 T, to obtain simple, economical and energy efficient systems.

Furthermore, a material is sought having a magnetic entropy variation which does not occur in the form of an intense peak over a very narrow range of temperatures, but over a range of at least 10K, serving to cool the surrounding system over a broad temperature range. The amplitude of the transition temperature, defined by the peak width of entropy variation at peak mid-height $2\Delta T_{LMH}$ must therefore be higher than or equal to 20K, or a value of $\Delta T_{LMH}$ higher than or equal to 10K.

It is also desirable for the material not to age during its use, and that the thermal hysteresis of the material should be low, lower than 8K and preferably lower than 5K.

Figure 1:
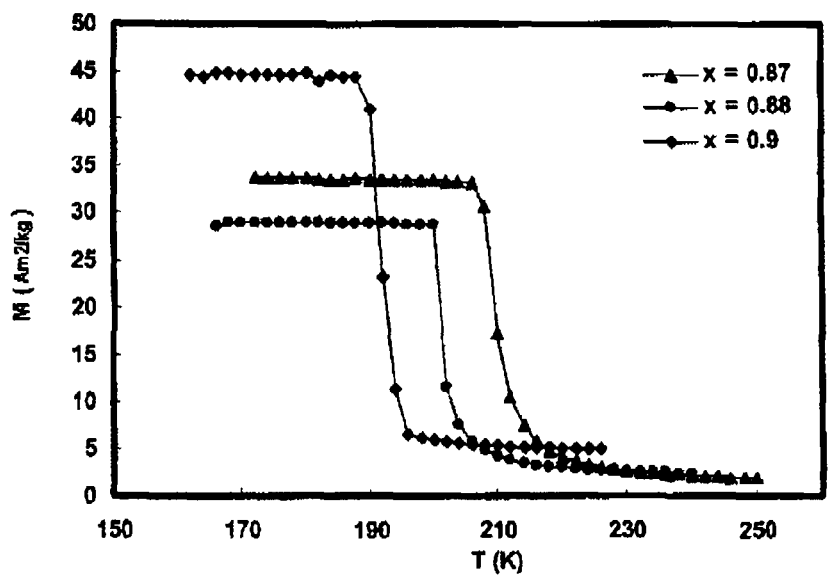
FIG. 1 shows the variation in magnetic magnetization M as a function of temperature T under a field of 5T for alloys $TR_1(Fe_xSi_{1-x})_{13}Ca_{0.0006}O_{0.0088}$.

It is the object of the present invention to provide such a material.

A first object of the invention thus consists of an Fe—Si—La alloy having the atomic composition:

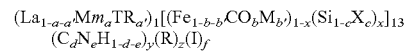

$(La_{1-a-a'}Mm_aTR_{a'})_1[(Fe_{1-b-b'}Co_bM_{b'})_{1-x}(Si_{1-c}X_c)_x]_{13}$
$(C_dN_eH_{1-d-e})_y(R)_z(I)_f$

Mm representing a mixture of lanthanum, cerium, neodymium and praseodymium in the weight proportion of 22 to 26% La, 48 to 53% Ce, 17 to 20% Nd and 5 to 7% Pr, the said mixture possibly comprising up to 1% by weight of impurities, TR representing one or more elements of the rare earth family other than lanthanum, M representing one or more type d transition elements of the 3d, 4d and 5d layers X representing a metalloid element selected from Ge, Al, B, Ga and In R representing one or more elements selected from Al, Ca, Mg, K and Na, I representing one or two elements selected from O and S, with:

$0 \le a < 0.5$ and $0 \le a' < 0.2$ $0 \le b \le 0.2$ and $0 \le b' < 0.4$ $0 \leq c \leq 0.5$ and $0 \leq d \leq 1$ $0 \leq e \leq 1$ and $f \leq 0.1$ $0.09 \leq x \leq 0.13$ and $0.002 \leq y \leq 4$ $0.0001 \leq z \leq 0.01$ the subscripts b, d, e, x and y being such that the alloy further satisfies the following condition:

$$6.143b(13(1-x))+4.437y[1-0.0614(d+e)] \geq 1 \quad \text{Eq.1}$$

$$d*y \geq 0.005 \quad \text{Eq.2}$$

The alloy according to the invention may further comprise the following additional features, considered alone or in combination:

M may represent one or more elements selected from nickel, manganese and chromium, R may represent calcium, Possibly $a=0$, $a'=0$, $b=0$, $b'=0$ and $c=0$.

TR may represent cerium and/or yttrium,

Possibly $d<0.01$,

Possibly $d \geq 0.7$.

A second object of the invention consists of a powder of Fe—Si—La alloy according to the invention, of which the average grain size is lower than 1000 µm and preferably lower than 500 µm.

A third object of the invention consists of a method for fabricating a powder of an alloy according to the invention, comprising the steps consisting in:

preparing a precursor of the alloy according to the invention, having the atomic composition:

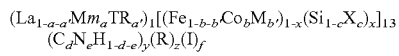

Mm representing a mixture of lanthanum, cerium, neodymium and praseodynium in the weight proportion of 22 to 26% La, 48 to 53% Ce, 17 to 20% Nd and 5 to 7% Pr, the said mixture possibly comprising up to 1% by weight of impurities, TR representing one or more elements of the rare earth family other than lanthanum, M representing one or more type d transition elements of the 3d, 4d and 5d layers X representing a metalloid element selected from Ge, Al, B, Ga and In R representing one or more elements selected from Al, Ca, Mg, K and Na, I representing one or two elements selected from O and S, with:

$0 \leq a < 0.5$ and $0 \leq a' < 0.2$ $0 \leq b \leq 0.2$ and $0 \leq b' < 0.4$ $0 \leq c \leq 0.05$ and $0 \leq d \leq 0.99$ $0 \leq e \leq 1$ and $f \leq 0.1$ $0.09 \leq x \leq 0.13$ and $0.002 \leq y \leq 0.7$ $0.0001 \leq z \leq 0.01$ the subscripts b, d, e, x and y being such that the alloy further satisfies the following condition:

$$6.143b(13(1-x))+4.437y[1-0.0614(d+e)] \geq 1 \quad \text{Eq.1}$$

$$d*y \geq 0.005 \quad \text{Eq.2}$$

casting it and solidifying it in ingot form, optionally carrying out an electroslag remelting or vacuum remelting, comminuting the ingot into a powder of particles, carrying out a homogenizing heat treatment with air or under blanket gas on the alloy either just before, or just after its fractionation, and carrying out a diffusion treatment on the said powder of at least one of the elements selected from carbon, hydrogen and nitrogen, in order to obtain an alloy powder having the final target composition.

In a preferred embodiment, the method according to the invention may comprise the following steps consisting in:

casting and solidifying the said precursor in ingot form, at least one of the following operations being further carried out:

maintaining the freshly solidified ingot at a temperature above 1300° C. but lower than the melting point, for less than 24 hours, carrying out an electromagnetic agitation during the ingot casting and during the solidification, heating the ingot after its first solidification to a temperature above 1300° C. so that it returns at least partially to the liquid state, and then solidifying it again, comminuting the ingot into a powder of particles, carrying out a diffusion treatment on the said powder of at least one of the elements selected from carbon, hydrogen and nitrogen, in order to obtain an alloy powder having the final target composition.

It may also comprise the steps consisting in:

comminuting the said ingot into a powder of particles having a size lower than 10 mm, carrying out a fine comminution and homogenizing treatment in hydrogen at a temperature lower than 300° C. to obtain a powder of particles having a size lower than 1000 µm, carrying out a diffusion treatment on the said powder at a temperature lower than 400° C., of at least one of the elements selected from carbon, hydrogen and nitrogen, in order to obtain an alloy powder having the final target composition.

In another embodiment, the method for fabricating an alloy powder according to the invention comprises the steps consisting in:

preparing a precursor of the alloy according to the invention, of which the composition is such as defined above, atomizing it in molten form, without prior solidification, in order to obtain a powder of particles and carrying out a diffusion treatment on the said powder of at least one of the elements selected from carbon, hydrogen and nitrogen, in order to obtain an alloy powder having the final target composition.

In another embodiment, the alloy fabrication method according to the invention comprises the steps consisting in:

preparing a precursor of the alloy according to the invention, of which the composition is such as defined above, solidifying it in the form of a strip, wire or powder of particles by overhardening and carrying out a diffusion treatment on the said strip, the said wire or the said powder of at least one of the elements selected from carbon, hydrogen and nitrogen, in order to obtain an alloy strip, wire or powder having the final target composition.

The invention also relates to a powder of Fe—Si—La alloys, comprising at least two different alloys $A_1$ and $A_2$ according to the invention, selected so that the transition temperatures $Ttr_1$, $Ttr_2$ and the peak widths at mid-height $\Delta T_{LMH1}$, $\Delta T_{LMH2}$ of their respective curves of variation in magnetic entropy $\Delta S_{m1}(T)$ and $\Delta S_{m2}(T)$ are such that their respective working zones ($Ttr_1-\Delta T_{LMH1}$; $Ttr_1+\Delta T_{LMH1}$) and ($Ttr_2-\Delta T_{LMH2}$; $Ttr_2+\Delta T_{LMH2}$) overlap.

In a preferred embodiment, the alloy powder is such that the said alloys $A_1$ and $A_2$ are obtained from the same precursor material P subjected to two different diffusion treatments of at least one of the elements selected from carbon, hydrogen and nitrogen.

The invention finally relates to a precursor material for fabricating alloys according to the invention.

The family of alloys according to the invention therefore has a composition in atomic % having the following formula:

$$(La_{1-a-a'}Mm_aTR_{a'})_1[(Fe_{1-b-b'}Co_bM_{b'})_{1-x}(Si_{1-c}X_c)_x]_{13}$$
$$(C_dN_eH_{1-d-e})_y(R)_z(I)_f$$

Mm represents a mixture of lanthanum, cerium, neodymium and praseodynium in the weight proportion of 22 to 26% La, 48 to 53% Ce, 17 to 20% Nd and 5 to 7% Pr, the said mixture possibly comprising up to 1% by weight of impurities. The use of Mm (or Misch-metall) essentially consisting of rare earths and abundantly available, allows easier industrial preparation, and an advantageous contribution in the magnetocaloric properties thanks in particular to its high cerium and lanthanum contents.

TR represents one or more elements of the rare earth family other than lanthanum. Mention can be made in particular of the elements Y, Ce, Pr, Nd, Sm, Eu, Gd, Tb, Dy, Ho, Er, Tm, Yb and preferably cerium and/or yttrium.

M represents one or more type d transition elements of the 3d, 4d and 5d layers and in particular nickel, manganese and/or chromium, which may partially substitute for the iron, in order to modify the transition temperature $T_{tr}$ more accurately.

X represents a metalloid element selected from Ge, Al, B, Ga and In, which may substitute for the silicon, in order to broaden the $\Delta S_m(T)$ peak, i.e. increase the value of $\Delta T$.

R represents one or more reducing elements selected from Al, Ca, Mg, K and Na. It is very important to control these elements to obtain good magnetocaloric properties, because they considerably hinder the oxidation of the rare earth elements such as lanthanum and cerium, for example, during the phase of electric arc melting or induction melting of the materials. Thanks to their presence, very few rare earths are converted to oxides and a very high proportion of these elements can therefore play the expected magnetocaloric function in the final material. These reducing elements are therefore deliberately added to the melt to form their oxides with the risk of preserving a portion thereof in the final material, rather than oxidizing part of the rare earths, which would make the production yield less satisfactory and would significantly degrade the final magnetocaloric performance.

Furthermore, these elements, which are strong reducing agents, also limit the reduction of the ceramic bricks of the crucibles of the melting furnaces by the rare earths at temperatures above 1000° C., thereby further improving the material yield of the fabrication method and also the accurate achievement of the target composition.

I represents one or two elements selected from oxygen and sulphur. These elements are poisonous because they combine easily with the rare earths during the melting and solidification and therefore neutralize them with regard to their magnetocaloric capacity. Their content should therefore be limited to the minimum. This can be obtained in particular by using pure raw materials, and also by employing a production method such as vacuum melting or melting under controlled atmosphere or protective and reducing electroslag melting. It is also possible to carry out a chemical homogenizing heat treatment, at low temperature, non-oxidizing (inert or reducing gas such as hydrogen or non-oxidizing gas such as carbon or nitrogen at low temperature).

The alloys according to the invention contain one or more interstitial elements diffusing at low temperature selected from carbon, nitrogen and hydrogen. Carbon and nitrogen are deoxidizing elements which have the particular action of limiting the activity of the oxygen in the melt and thereby, in doing so, the oxidation of the rare earth and hence also a powerful reduction of the drift in composition between the target composition and the real composition of the solid material. Carbon is selected for this deoxidation, and a minimum of 0.01% by weight always remains in the precursor in the divided state, thereby satisfying equation 2. However, its content is limited to 1% by weight to avoid excessive carbide formation.

Figure 2:
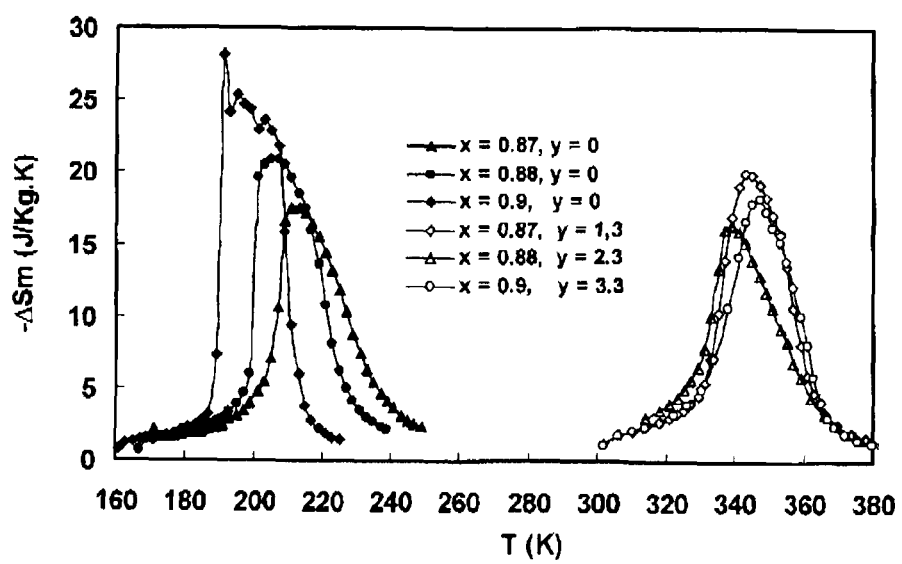
FIG. 2 shows the variation in magnetic entropy as a function of temperature T under a field of 5T for hydride alloys $La(Fe_xSi_{1-x})_{13}H_yCa_{0.0006})O_{0.0088}$.
Figure 3:
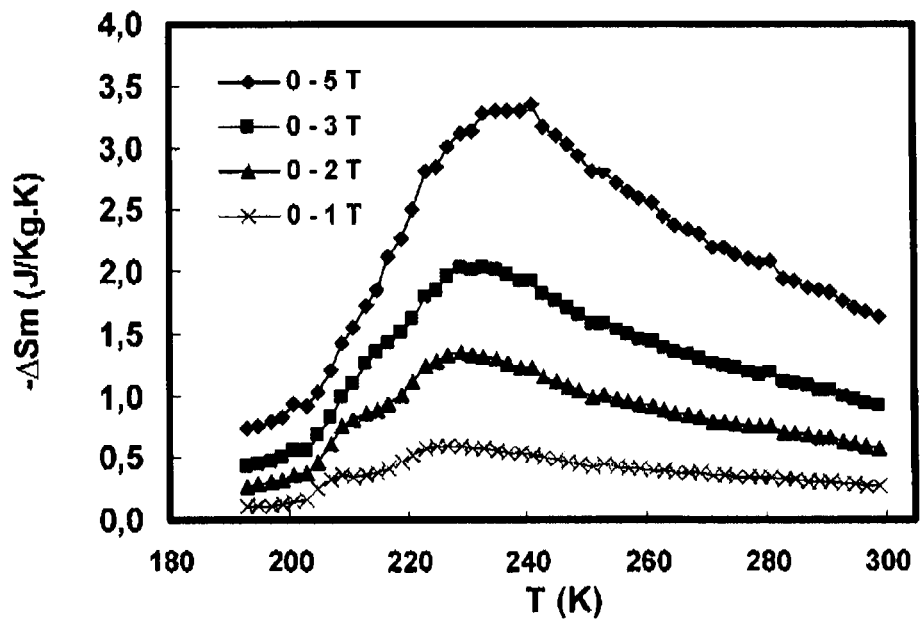
FIG. 3 shows the variation in magnetic entropy as a function of temperature T under various fields from 1 to 5T for the nitride alloy $LaFe_{11.7}Sil_{1.3}N_{1.3}Ca_{0.0006}O_{0.0088}$.

Furthermore, carbon, nitrogen and hydrogen have an influence on the magnetocaloric properties of the materials according to the invention. This influence has been investigated more thoroughly and is illustrated in the form of the FIGS. 1 to 3 which show:

FIG. 1: variation in magnetic magnetization M as a function of temperature T under a field of 5 T for alloys $TR_1$ $(Fe_xSi_{1-x})_{13}Ca_{0.0006}O_{0.0088}$, FIG. 2: variation in magnetic entropy as a function of temperature T under a field of 5 T for hydride alloys $La(Fe_xSi_{1-x})_{13}H_yCa_{0.0006}O_{0.0088}$, FIG. 3: variation in magnetic entropy as a function of temperature T under various fields from 1 to 5 T for the nitride alloy $LaFe_{11.7}Si1_{1.3}N_{1.3}Ca_{0.0006}O_{0.0088}$.

FIG. 1 shows that in materials not comprising interstitial elements (C, N, H), the transition temperature $T_{tr}$ never reaches 220K when the Fe/Si ratio is varied in the narrow range (x=0.90 to 0.87) in which advantageous magnetocaloric performance is obtained. It is therefore essential to add these elements.

FIG. 2 shows that the insertion of a high content of hydrogen substantially raises the transition temperature $T_{tr}$ from 200 to 340K, while very moderately degrading magnetocaloric performance.

FIG. 3 shows that the insertion of a high content of nitrogen moderately raises the transition temperature $T_{tr}$ from 200 to 230K, while considerably extending the MCE working temperature range ($\Delta T_{LMH}$=60K at 2 T). The magnetic transition temperature, and the temperature range of the magnetocaloric effect, can therefore be advantageously shifted by the insertion of nitrogen and the formation of nitrides. This serves to control the magnetic refrigeration in a very broad temperature interval, for example from 210 to 330K, by using a single precursor alloy which is more or less nitrided.

The magnetocaloric effect can thus be induced at temperatures above ambient temperature. With the nitrides, furthermore, the magnetocaloric effect obtained is always more intense than the effect induced with the starting non-nitrided precursor alloys.

Moreover, the present inventors have also discovered that, in addition to the presence of these interstitial elements, the composition of the alloys according to the invention must satisfy the following equation to guarantee a transition temperature $T_{tr}$ of at least 220K:

$$6.143b(13(1-x))+4.437y[1-0.0614(d+e)] \geq 1$$

Figure 4:
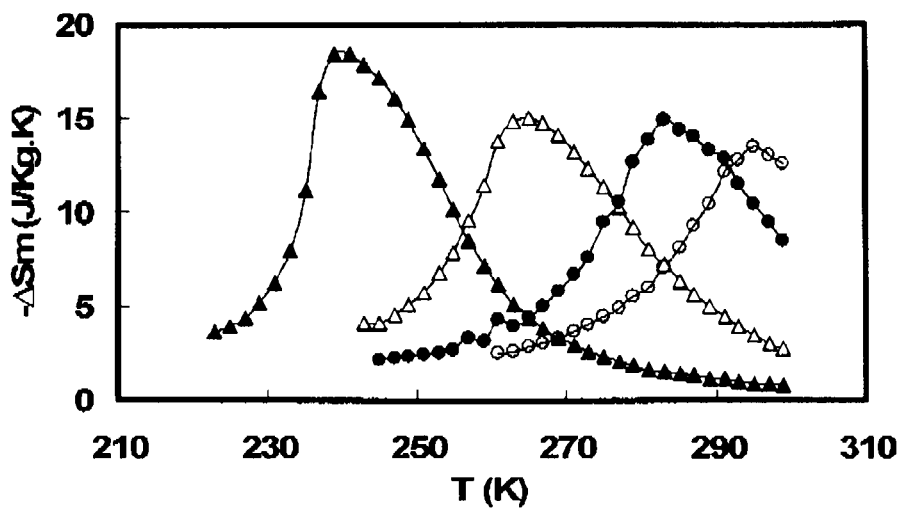
FIG. 4 shows the variation in magnetic entropy as a function of temperature T under a field of 5T for the alloys $LaFe_{11.3}Co_{0.4}Si_{1.31}Ca_{0.0006}O_{0.0088}$, $LaFe_{11.1}Co_{0.6}Si_{1.31}Ca_{0.0006}O_{0.0088}$, $LaFe_{11.1}Co_{0.8}Si_{1.11}Ca_{0.0006}O_{0.0088}$, $LaFe_{11}Co_{0.9}Si_{1.1}Ca_{0.0006}O_{0.0088}$ (respectively from left to right in the figure).

As indicated by the general formula, the iron in the alloy according to the invention can be substituted by cobalt. The influence of cobalt has been investigated in greater detail, as indicated in FIG. 4 which shows the variation in magnetic entropy as a function of temperature T under a field of 5 T for the alloys $LaFe_{11.3}CO_{0.4}Si_{1.31}Ca_{0.0006}O_{0.0088}$, $LaFe_{11.1}CO_{0.6}Si_{1.31}Ca_{0.0006}O_{0.0088}$ $LaFe_{11.1}CO_{0.8}Si_{1.11}Ca_{0.0006}O_{0.0088}$, $LaFe_{11.1}CO_{0.9}Si_{1.1}Ca_{0.0006}O_{0.0088}$ (respectively from left to right in the figure).

When 3.4% to 7.6% of the iron in the alloy is substituted by cobalt, the transition temperature $T_{tr}$ can be seen to increase from 240 to 295K, while slightly degrading the magnetocaloric performance. The substitution of iron by cobalt therefore serves to better control and increase the Curie temperature towards ambient temperature and thereby cover a wide refrigeration range from 240 to 300K with the magnetocaloric effect of the refrigerants, which remains far superior than for the prior art materials such as gadolinium.

Advantageously, the materials according to the invention may be in the form of a powder formed of particles having a size lower than 1000 µm, preferably lower than 500 µm, and even more preferably lower than 200 µm, or even lower than 100 µm. This is because the low dimension of the particles serves to obtain a material that promotes heat exchanges and in particular the rapid extraction of the negative heat towards a heat transfer fluid. For this purpose, the material according to the invention can also be used in the form of a thin plate, or a wire, for example by forming a composite blending this powder in a majority proportion with an organic binder; plastic, plant or metallic.

For the industrial use of the material according to the invention, the composition of the precursor alloy must be uniform and obtained accurately with regard to the theoretical target. The preparation method must be compatible with the need to chemically homogenize the particles perfectly in order to obtain the stoichiometric proportions of the compound at all points, and thereby the anticipated magnetocaloric performance.

Use can also be made of a first alternative of the fabrication method by producing an ingot followed by crushing-grinding. The ingot is produced by vacuum (or inert gas) induction melting or by protective electroslag melting for casting an ingot, and then optionally followed by Electrode Slag Remelting (ESR) or Vacuum Arc Remelting (VAR) of the ingot. The material produced, called precursor, has the final target composition for all the elements, with the exception of carbon, hydrogen and/or nitrogen, of which the final values will be adjusted during the diffusion post-treatment.

A high temperature heat treatment is then carried out for chemical homogenizing (1100 to 1400° C.-10 h to 10 days) in air or under protective gas; this treatment can also be carried out later on the powders rather than on the ingot. The particular purpose of this treatment is to reduce the free iron or cobalt (i.e. not incorporated in the compound according to the invention) to not more than a few atomic percent (typically less than 5 at %) and thereby obtain the desired magnetocaloric performance.

This ingot is then comminuted into blocks by crusher, and then into submillimeter-scale particles by high energy grinder.

A number of possible alternatives may also be considered for the mechanical transformation into the powder from the ingot or the block and in particular:
  impact crushing,
  attrition (inter-particle friction) between particles and moving parts,
  attrition by self-impact (two jets of powder are projected against one another),
  cold jet technique sending the particles to burst on a target by a stream of cold gas,
  high energy attrition called "mechanical alliation",
  shearing (by grinding-crushing),
  compression.

One advantageous alternative of the method according to the invention consists in eliminating the high temperature heat treatment after preparation and casting of the ingot, which is unproductive because very time consuming. This can be achieved in particular by one or the other of the operations described below, used separately or in combination:
  maintaining the freshly solidified ingot at a temperature above 1300° C. but lower than the melting point (close to the liquidus), for less than 24 hours,
  carrying out an electromagnetic agitation during the ingot casting and during the solidification,
  heating the ingot after its first solidification to a temperature above 1300° C. so that it returns at least partially to the liquid state, and then solidifying it again, and thereby homogenizing by successive temperature round-trips.

This alternative was accordingly tested by performing tests by high-frequency melting of ingots according to the invention, and then holding these ingots immediately below the melting point (about 1350° C.) for a predefined time.

Thus, for a heat treatment of two hours, the resulting free iron content is close to 4-5 at %, and becomes highly advantageous for a time of 4 hours, falling close to only 2 at %. A longer annealing reduces this content even more.

This alternative serves in particular to produce large masses of very high grade compounds according to the invention rapidly, based on a short-term heat treatment applied immediately after the melting.

Another advantageous alternative of the method according to the invention for eliminating the high temperature heat treatment after preparation, consists in going directly from the stage of the as-cast ingot to an intermediate comminuted state (millimeter-scale or submillimeter-scale), and then performing a specific treatment called "decrepitation" under hydrogen, which allows both a transformation of the ingot into small sized particles (typically lower than 1000 µm), the complete or partial hydriding of the particles, and an easy and rapid chemical homogenizing. The optional subsequent diffusion of carbon and/or nitrogen is thereby also facilitated.

This decrepitation annealing under hydrogen must be carried out at a temperature below 300° C. and preferably between 200 and 250° C., under a hydrogen pressure generally above 1 atm (preferably higher than 3 atm) and serves to obtain fine powders.

A post-heat treatment can then optionally be applied to adjust the properties by inserting carbon and/or nitrogen by annealing at below 400° C. This treatment must nevertheless be sufficiently rapid to allow the insertion of carbon and nitrogen while preventing a demixing reaction of the compound of iron (or cobalt) from occurring in proportions such that a lanthanum nitride or carbide is formed.

The use of fine particles obtained by decrepitation is suitable for operating more safely, because since the light elements diffuse by interfacial propagation, the insertion reaction is completed from 390° C. thanks to a better kinetics, and before the occurrence of the demixing reaction, which begins at 410° C.

It is thereby possible to prepare high grade carbides and nitrides containing two to three times less iron as an impurity than during direct reactions with carbon or nitrogen, the reduced size of the particles preventing the initiation of the demixing reaction before the insertion reaction is completed.

Another alternative of the fabrication method can also be used, by atomization into powder from the molten metal issuing from a high frequency melting by vacuum induction melting or electroslag melting, or even a pre-prepared electrode.

Other possible atomization alternatives can thus be considered:
  atomization by gas: the molten metal is injected under pressure into a chamber under vacuum or protective gas and interacting strongly with a high speed gas jet, producing a vaporization of fine droplets that are quickly cooled,
  atomization by liquid: identical to the preceding case in which the high speed gas is replaced by a high pressure liquid jet,
  centrifugal atomization by pre-prepared rotating electrode made from an alloy of the material according to the invention, forming an electric arc plasma with cathode facing the end of the rotating anode,
  possible alternatives of atomization by rotating anode: rotating disc, rotating crucible, vibrating electrode,
  melt explosion.

Use can also be made of a third alternative of the fabrication method by means close to atomization, i.e. by violent cooling of the molten metal along at least one direction of the particle or the strip or the wire formed (hyperquench). The following can be used:
  wheel quenching: well-known technique for producing amorphous products or microcrystallized material in thin strips (20-50 μm)
  water quenching: well-known technique for producing amorphous products or microcrystallized materials in small-diameter wires (20-50 μm)
  cold or liquefied gas quenching.

Regardless of the method used to implement the invention, it is preferable to use a technology in which the preparation of the material in finally divided portions (called precursor) is detached from a post-method which accurately adjusts the transition temperature $T_{tr}$ to the desired value. Production is thus far more robust because the problems of preparation can largely be dealt with by the post-method for adjusting $T_{tr}$.

This post-method may consist of a low temperature method of heat treatment of diffusing species (C, N, H), obtained by solid-gas reaction above the previously chemically homogeneous particles issuing from the first part of the method.

The nitrides can thus be produced by solid-gas reaction, either using molecular nitrogen or ammonia. The reaction, preferably carried out on powdery materials, is preferably carried out in a temperature interval from 300 to 400° C.

Tests

The alloy precursors are prepared by melting by high frequency vacuum induction melting and then atomized under vacuum. The powder thus obtained is a powder of particles having a diameter of between 50 and 100 μm, with low chemical segregation, which is then subjected to a homogenizing heat treatment for 5 h at 1200° C. under pure hydrogen to obtain a series of precursor materials.

Table 1 provides information about the compositions of the precursor materials before they have been subjected to the carbon and/or nitrogen and/or hydrogen diffusion treatments.

TABLE 1

Composition of Precursors

| No. | Type | Precursor | $T_{tr}$ (K) |
|---|---|---|---|
| 1 | Comp | $La_1[Fe_{0.87}Si_{0.13}]_{13}(C_{0.8}N_{0.2})_{0.01}Ca_{0.001}O_{0.0025}$ | 210 |
| 2 | Inv | $La_1[Fe_{0.87}Si_{0.13}]_{13}(C_{0.8}N_{0.2})_{0.01}Ca_{0.0012}O_{0.0033}$ | 252 |
| 3 | Inv | $La_1[Fe_{0.87}Si_{0.13}]_{13}(C_{0.8}N_{0.2})_{0.01}Ca_{0.0017}O_{0.0037}$ | 338 |
| 4 | Comp | $La_{0.96}[Fe_{0.87}Si_{0.13}]_{13}(C_{0.8}N_{0.2})_{0.01}Ca_{0.00006}O_{0.0088}$ | 331 |

It should be observed that in the precursor state, the materials already contain a residual carbon and nitrogen content, which serves to limit the oxygen activity in the melt and hence the significant oxidation in the melt of the most reducing elements, such as the rare earths, calcium or magnesium.

The powders are then subjected to a low temperature nitriding treatment under $N_2$ between 300 and 400° C., or hydrogenated at 200-300° C. for a few hours, according to the alloys concerned.

Since the precursor powders already contain carbon and nitrogen, the subsequent nitriding or hydrogenation treatment, at low or medium temperature, serves to give the final powder its final composition, given in Table 2.

TABLE 2

Final Compositions

| Alloy | | Coefficients of the General Chemical Formula | | | | | | | | | | | |
|---|---|---|---|---|---|---|---|---|---|---|---|---|---|
| No. | Type | a | a' | b | b' | x | c | d | e | y | z | f | Eq. 1 | Eq. 2 |
| 1 | Comp | 0 | 0 | 0 | 0 | 0.13 | 0 | 0.8 | 0.2 | 0.01 | 0.001 | 0.0025 | <u>0.042</u> | 0.008 |
| 2 | Inv | 0 | 0 | 0 | 0 | 0.13 | 0 | 0.008 | 0.992 | 1 | 0.0012 | 0.0033 | 4.16 | 0.008 |
| 3 | Inv | 0 | 0 | 0 | 0 | 0.13 | 0 | 0.008 | 0.002 | 1.3 | 0.0017 | 0.0037 | 5.76 | 0.0104 |
| 4 | Comp | 0 | 0 | 0 | 0 | 0.13 | 0 | 0.008 | 0.002 | 1.3 | <u>0.00006</u> | 0.0088 | 5.76 | 0.0104 |

The materials according to the invention were then subjected to tests to check their magnetocaloric properties, and in particular, their magnetization curves M as a function of time T and of enthalpy H were determined.

The magnetization curves M(T, H) are obtained using an extraction magnetometer, which, according to the apparatus, can scan temperature ranges from 1.5 to 300K, or from 300 to 900K. The powder sample is compacted in a nonmagnetic austenitic stainless steel cylinder, which is placed in the field of the superconducting coil and moved in a magnetic flux detection device consisting of two coils (detecting magnetic fluxes in the opposite direction) mounted in series. During the movement of the sample from the centre of one measurement coil to the centre of the second coil, the induced voltage, proportional to the magnetization M of the sample, is integrated.

Based on the M(T, H) curves thus obtained, the entropy values $\Delta S_m(T)$ are determined by numerical integration using the formula below:

$$\Delta S_m = \int_0^H \left(\frac{\delta M}{\delta T}\right) \cdot dH$$

The test results are given in Table 3.

TABLE 3

| | | Results | | | | |
|---|---|---|---|---|---|---|
| | | Imbalance with | Deposition of RE | | Measurements at 2T | | |
| Alloy No. | Type | regard to the target composition | oxides on the crucible walls | $T_{tr}$ (° K) | $\Delta T_{LMH}$ (° K) | $\Delta S_{max}$ (J/kg·K) | RCP (J/kg) |
| 1 | Comp | 1 | Very low | 210 | 14.4 | 12.5 | 180 |
| 2 | Inv | 1 | 0 | 252 | 72 | 2.1 | 151 |
| 3 | Inv | 1 | 0 | 338 | 11 | 11.5 | 126.5 |
| 4 | Comp | 0.96 | High | 331 | 16 | 3.5 | 54 |

In the absence of cobalt, it is found that a minimum of nitrogen or hydrogen is needed for the transition to occur at a temperature above 220K: this is also described in the invention by equation 1. The alloy 1 shows that the temperature of 220K cannot be reached in the presence of too little carbon and nitrogen, whereas calcium is sufficient to negligibly oxidize the rare earths and to accurately obtain the target composition, and therefore also the optimal magnetocaloric performance.

A minimum of calcium, for example, ensures that virtually all the rare earths, such as lanthanum, will remain in the melt and the solidified ingot, thereby allowing for a very good correspondence between the target composition and composition obtained, and hence good magnetocaloric performance. Alloy No. 4 contains very little calcium and in consequence, a few percent of all the rare earth atoms are found in oxide form, lost for the magnetocaloric properties, with the essential result of deviating from the ratio 1:13 between the rare earths and the other elements of the substitution lattice, causing a steep drop in the magnetocaloric properties.

It should be noted that the magnetocaloric performance of alloy No. 4 still remains advantageous, but from the standpoint of its fitness for industrial use, an excessively low content of reducing elements makes the alloy unreliable, with a wide variability of composition obtained for a single target composition (actual/target deviation of 0.96).

It is also observed, on the one hand, that the nitriding and hydriding increase the transition temperature $T_{tr}$ above 220K, and, on the other hand, that this behaviour remains valid in the presence of calcium added to stabilize the composition of the melt and to prevent the conversion of part of the rare earths to oxides. Moreover, while hydriding slightly degrades the working temperature range (11K instead of 14.4K), but considerably increases $T_{tr}$ (by 128K on alloy No. 3 compared to alloy No. 1), nitriding, on the contrary, slightly raises the transition temperature (by 42K) but considerably extends the working temperature range while the maximum entropy under 2 T decreases sharply, but the cooling capacity of the material (RCP=$\Delta T_{LMH} \cdot \Delta S_{max}$) remains virtually unchanged (151 instead of 180 J/kg) and is even higher than that of the hydrided material.

A second series of tests was then conducted on materials with a high carbide content. The materials are prepared by high frequency vacuum induction melting and cast in ingots, producing high chemical segregation. The ingots are then culminated into blocks with a crusher and then into millimeter-scale particles using the centrifugal grinder. The particles are then subjected to a homogenizing heat treatment on fluidized-alumina bed at 1300° C. under argon for 24 hours. The chemically homogenized particles are then more finely ground into powder having a diameter of 100±50 µm and then subjected to a low temperature carburizing heat treatment by $CH_4$ cracking at a temperature lower than 800° C. for 10 hours.

The final compositions of the materials obtained are given in Table 4.

TABLE 4

| | | Final Compositions | | | | | | | | | | |
|---|---|---|---|---|---|---|---|---|---|---|---|---|
| | | Coefficients of the General Chemical Formula | | | | | | | | | | |
| No. | Type | a | a' | b | b' | x | c | d | e | y | z | f |
| 5 | Comp | 0 | 0 | 0 | 0 | 0.13 | 0 | 0.8 | 0.2 | 0.01 | 0.001 | 0.0025 |
| 6 | Comp | 0 | 0 | 0 | 0 | 0.12 | 0 | 0.7 | 0.3 | 0.01 | 0.0012 | 0.0022 |
| 7 | Comp | 0 | 0 | 0 | 0 | 0.10 | 0 | 0.9 | 0 | 0.01 | 0.0015 | 0.0031 |
| 8 | Inv | 0 | 0 | 0 | 0 | 0.13 | 0 | 0.98 | 0.02 | 1 | 0.0013 | 0.0026 |
| 9 | Comp | 0.2 | 0 | 0 | 0 | 0.10 | 0 | 0.9 | 0 | 0.01 | 0.0013 | 0.0031 |
| 10 | Inv | 0.2 | 0 | 0 | 0 | 0.10 | 0 | 0.98 | 0.02 | 1 | 0.0018 | 0.0022 |
| 11 | Inv | 0.2 | 0 | 0 | 0 | 0.10 | 0 | 0.95 | 0.05 | 1.8 | 0.0011 | 0.0019 |
| 12 | Inv | 0 | 0 | 0 | 0 | 0.12 | 0 | 0.02 | 0.01 | 3.4 | 0.0012 | 0.0022 |
| 13 | Inv | 0 | 0 | 0.034 | 0 | 0.1 | 0 | 0.7 | 0.3 | 0.01 | 0.0012 | 0.0022 |
| 14 | Inv | 0 | 0 | 0.034 | 0 | 0.1 | 0 | 0.98 | 0.02 | 0.3 | 0.0024 | 0.0027 |
| 15 | Inv | 0 | 0 | 0.034 | 0 | 0.1 | 0 | 0.99 | 0.01 | 0.6 | 0.0018 | 0.0022 |
| 16 | Comp | 0 | 0 | 0.034 | 0 | 0.1 | 0 | 0.97 | 0.03 | 0.6 | 0.00007 | 0.0022 |
| 17 | Inv | 0 | 0 | 0.05 | 0 | 0.1 | 0 | 0.75 | 0.25 | 0.01 | 0.0008 | 0.0029 |
| 18 | Comp | 0 | 0 | 0.05 | 0 | 0.1 | 0 | 0.75 | 0.25 | 0.03 | 0.00008 | 0.0021 |
| 19 | Inv | 0 | 0 | 0.05 | 0 | 0.1 | 0 | 0.98 | 0.02 | 0.5 | 0.0015 | 0.0027 |
| 20 | Comp | 0 | 0 | 0.05 | 0 | 0.1 | 0 | 0.99 | 0.01 | 0.5 | 0.00007 | 0.0024 |
| 21 | Inv | 0 | 0 | 0.067 | 0 | 0.09 | 0 | 0.7 | 0.3 | 0.01 | 0.0015 | 0.0018 |
| 22 | Inv | 0 | 0 | 0.067 | 0 | 0.09 | 0 | 0.97 | 0.03 | 0.1 | 0.0025 | 0.0024 |
| 23 | Inv | 0 | 0 | 0.075 | 0 | 0.09 | 0 | 0.7 | 0.3 | 0.01 | 0.0016 | 0.0028 |
| 24 | Inv | 0 | 0 | 0.075 | 0 | 0.09 | 0 | 0.97 | 0.03 | 0.1 | 0.0022 | 0.0022 |

These materials were then subjected to tests. The magnetic characterization M(T, H) was carried out as previously. The results obtained are given in Table 5.

TABLE 5

Results

| Alloy No. | Type | Imbalance with regard to the target composition | Deposition of RE oxides on the crucible walls | Measurements at 2T | | | |
|---|---|---|---|---|---|---|---|
| | | | | $T_{tr}$ (K) | $\Delta T_{LMH}$ (K) | $\Delta S_{max}$ (J/kg·K) | RCP (J/kg) |
| 5 | Comp | 1 | Very low | 210 | 14.4 | 12.5 | 180 |
| 6 | Comp | 1 | 0 | 202.5 | 9 | 17 | 153 |
| 7 | Comp. | 1 | 0 | 191 | 7 | 26.5 | 185.5 |
| 8 | Inv | 1 | 0 | 240 | 40 | 3.2 | 128 |
| 9 | Comp. | 1 | 0 | 183 | 6 | 8.5 | 51 |
| 10 | Inv | 1 | 0 | 256 | 18 | 8 | 144 |
| 11 | Inv | 1 | Very low | 313 | 27 | 7.5 | 202.5 |
| 12 | Inv | 1 | Very low | 341 | 12 | 13 | 156 |
| 13 | Inv | 1 | Very low | 240 | 10 | 13.5 | 135 |
| 14 | Inv | 1 | 0 | 250 | 20 | 10 | 200 |
| 15 | Inv | 1 | 0 | 258 | 32 | 8 | 256 |
| 16 | Comp | 0.96 | High | 258 | 32 | 8 | 256 |
| 17 | Inv | 1 | Very low | 265 | 13.5 | 10 | 135 |
| 18 | Comp | 0.98 | High | 265 | 13.5 | 10 | 135 |
| 19 | Inv | 1 | 0 | 299 | 31 | 6 | 186 |
| 20 | Comp | 0.97 | High | 299 | 31 | 6 | 186 |
| 21 | Inv | 1 | 0 | 283 | 13 | 10 | 130 |
| 22 | Inv | 1 | 0 | 287 | 20 | 8.5 | 170 |
| 23 | Inv | 1 | 0 | 295 | 14.5 | 8.5 | 123.25 |
| 24 | Inv | 1 | 0 | 301 | 22 | 8 | 176 |

It may be observed that carburizing, starting with a precursor material not yet carburized, can significantly raise the transition temperature (from 190-210K to typically 240-320K) and the temperature range $\Delta T$ (from 6-14K to typically 18 to 40K), while the maximum entropy exchanged $\Delta S_{max}$ remains higher than 3 J/kg·K. A major contribution of the invention is that the effect of the carbon on $T_{tr}$ remains effective in the presence of calcium.

A novel high performance industrial material is therefore obtained, having a target composition that is stabilized in the melt at the optimal composition without the deposition of rare earth oxides on the refractory walls of the furnaces, and thus the composition of the precursor fixes the optimal ratio 1:13 between the rare earths and the other substitution elements, while the subsequent low to medium temperature carbon diffusing annealing adjusts $T_{tr}$ to the precise target value.

Thus, for example, with material No. 15, it may be seen that the transition (258K) is very close to 0° C., hence highly relevant for refrigeration applications, whereas $\Delta T$ is 32K, indicating an effective working range for a refrigeration machine of about 60K, which is highly advantageous for significantly lowering the temperature of the system, while the magnetic entropy remains at levels as high as 7 to 10 J/kg·K, which are particularly effective for the efficiency of the refrigeration machines.

The contrary examples No. 5-7 and 9 clearly show that without the presence of cobalt and/or sufficient interstitial elements (C, N, H), the transition temperatures are too low (<220K) and even in certain cases, the working temperature range is also too narrow.

A minimum of calcium ensures that virtually all the rare earths, such as lanthanum, remain in the melt and the solidified ingot, thereby allowing a very close correspondence between the target composition and the composition obtained, and hence good magnetocaloric performance. Alloys Nos. 16, 18 and 20 contain very little calcium, and in consequence, a few percent of all the rare earth atoms are found in oxide form (deposits on the crucible walls), lost for the magnetocaloric properties, with the essential consequence of deviating the ratio 1:13 between rare earths and other substitution elements of the lattice, causing a significant reduction of the magnetocaloric properties.

It should be noted that the magnetocaloric performance of alloys Nos. 16, 18 and 20 still remain advantageous with regard to the specification for service properties, but with regard to the aptitude for industrial preparation, their excessively low content of reducing elements makes the alloy unreliable, with a wide variability of composition obtained for a single target composition (actual/target deviation of 0.96 to 0.98 instead of 1 on the three tests of alloys Nos. 16, 18 and 20).

Figure 5:
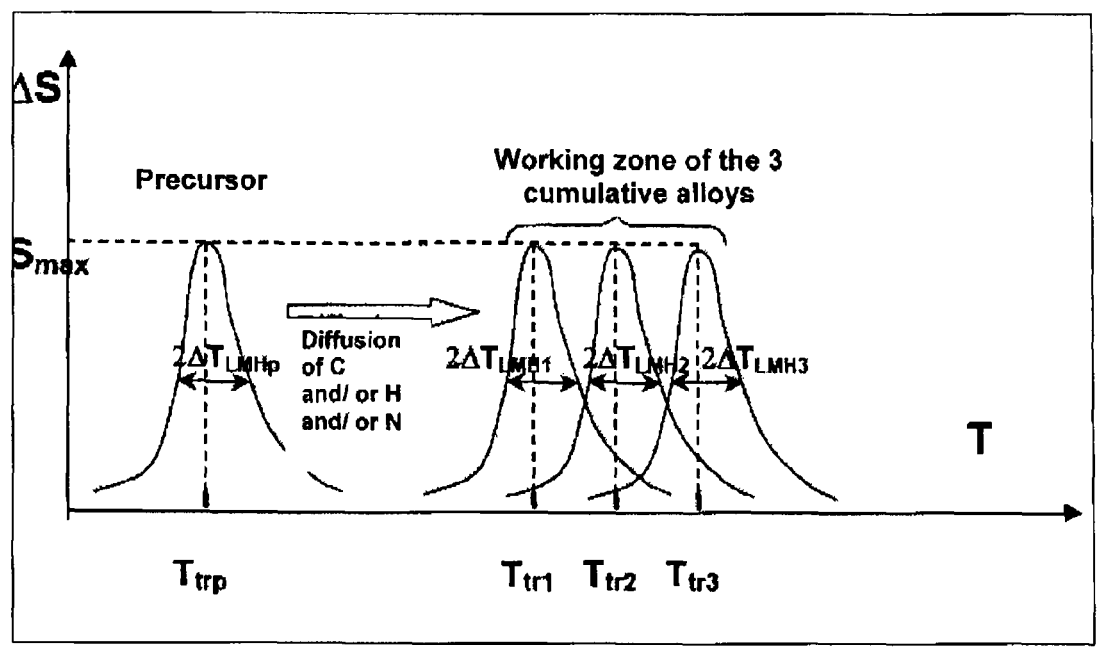
FIG. 5 shows that each component of a mixture has a temperature $T_{tr}$ that is offset with regard to the other components of the mixture.

The materials according to the invention can be used in the form of mixtures in which each component could, for example, account for 5 to 20% of the total weight of the mixture. The formulation of this mixture is preferably carried out to have a wider overall magnetocaloric contribution than that of a single material, each component being carefully selected so that its temperature $T_{tr}$ is offset with regard to the other components, as shown in FIG. 5.

Furthermore, the magnetocaloric materials according to the invention thus have the advantage of being able to adjust their properties by interstitial elements in a diffusion post-heat treatment, because it is thereby possible, with the same precursor material, to produce a wide variety of different products which therefore have different magnetocaloric properties, which can optionally be combined to extend the working range.

Thus, the joint use of the final materials Nos. 13, 14 and 15 fabricated from the same precursor, which may in this case be alloy No. 13 $(La_1[(Fe_{0.966}Co_{0.034})_{0.9}Si_{0.1}]_{13}(C_{0.7}N_{0.3})_{0.01}Ca_{0.0012}O_{0.0022})$, serves to juxtapose the working ranges $(T_{tr}-\Delta T_{LMH} \rightarrow T_{tr}+\Delta T_{LMH})$ of each of the three materials with overlap, thereby allowing magnetocaloric cooling over a continuous temperature range between 230K and 290K, which is relevant for numerous refrigeration applications:

TABLE 6

| Alloy No. | $T_{tr}$ (K) | $\Delta T_{LMH}$ (K) | Measurements at 2T $\Delta S_{max}$ (J/kg·K) | Working range in Tr (in K) |
|---|---|---|---|---|
| 13 | 240 | 10 | 13.5 | 230→250 |
| 14 | 250 | 20 | 10 | 230→270 |
| 15 | 258 | 32 | 8 | 226→290 |

The invention therefore provides a material having high magnetocaloric performance, capable of being produced industrially, optimally and reproducibly by accurate adjustment of the composition ratio of the major elements by the introduction of a rare earth reducer-stabilizer, a material whose performance can be adjusted from a precursor material via a diffusion heat treatment using interstitial elements (C, N, H). Moreover, the rare earth reducing-stabilizing elements do not degrade the magnetocaloric performance.

The materials according to the invention can be used in particular for fabricating refrigeration equipment. In fact, an active magnetic recovery system has been developed. In this system, the activation field of the magnetocaloric effect is created by magnets and moves around the material which exchanges the heat or cold with a heat transfer fluid flowing in the opposite direction to the magnetic field. All this serves to consider refrigerator systems which are thermodynamically efficient, industrial or automotive, for example.

Thus, the refrigerators using the principle of the magnetocaloric effect may be apparatus intended for domestic refrigeration (personal refrigerator), commercial refrigeration as in mass merchandizing (refrigeration array), industrial refrigeration (refrigerated warehouse), technical refrigeration (gas liquefaction or cryogenics) and built-in refrigeration (electronic components or modules).

Yet it is equally possible to integrate the materials according to the invention in the technology of heat pumps, with well-known applications. Broadly speaking, these two types of heat generation/exchange (refrigerator, heat pump) can thus be applied to the temperature conditioning of vehicles, homes and apartments, buildings and industrial installations of all types.

Furthermore, the materials according to the invention can be protected on the surface from aqueous corrosion by a heat transfer fluid via a coating obtained by any type of method of the CVD, PVD, sol-gel, fluidized bed type, etc.

The invention claimed is:
1. An Fe—Si—La alloy comprising:

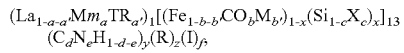

wherein Mm represents a mixture of lanthanum, cerium, neodymium and praseodynium in the weight proportion of 22 to 26% La, 48 to 53% Ce, 17 to 20% Nd, and 5 to 7% Pr, said mixture comprising up to 1% by weight of impurities;
TR represents at least one rare earth family element other than lanthanum;
M represents at least one type d transition element of the 3d, 4d, or 5d layers;
X represents a metalloid element selected from the group consisting of Ge, Al, B, Ga, and In;
R represents at least one element selected from the group consisting of Ca, Mg, K, and Na; and
I represents one or two elements selected from the group consisting of O and S;

$0 \leq a < 0.5$ and $0 \leq a' < 0.2$;

$0 \leq b \leq 0.2$ and $0 \leq b' < 0.4$;

$0 \leq c \leq 0.5$ and $0 \leq d \leq 1$;

$0 \leq e \leq 1$ and $f \leq 0.1$;

$0.09 \leq x \leq 0.13$ and $0.002 \leq y \leq 4$;

$0.0001 \leq z \leq 0.01$; and subscripts b, d, e, x and y are such that:

$6.143b(13(1-x))+4.437y[1-0.0614(d+e)] \geq 1$, and $d \times y \geq 0.005$.

2. The Fe—Si—La alloy according to claim 1, wherein M represents at least one element selected from the group consisting of nickel, manganese, and chromium.
3. The Fe—Si—La alloy according to claim 1, wherein R represents calcium.
4. The Fe—Si—La alloy according to claim 1, wherein a=0, a'=0, b=0, b'=0, and c=0.
5. The Fe—Si—La alloy according to claim 1, wherein TR represents cerium and/or yttrium.
6. The Fe—Si—La alloy according to claim 1, wherein d<0.01.
7. The Fe—Si—La alloy according to claim 1, wherein d≥0.7.
8. A powder of the Fe—Si—La alloy according to claim 1, having an average grain size smaller than 1000 μm.
9. The powder of the Fe—Si—La alloy according to claim 8, wherein the average grain size is smaller than 500 μm.
10. A method for fabricating a powder of the alloy according to claim 1, comprising:
preparing a precursor of the alloy comprising:

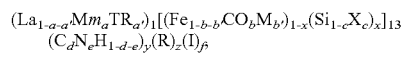

wherein Mm represents a mixture of lanthanum, cerium, neodymium, and praseodynium in the weight proportion of 22 to 26% La, 48 to 53% Ce, 17 to 20% Nd, and 5 to 7% Pr, said mixture comprising up to 1% by weight of impurities;
TR represents at least one rare earth family element other than lanthanum;
M represents at least one type d transition element of the 3d, 4d, or 5d layers;
X represents a metalloid element selected from the group consisting of Ge, Al, B, Ga, and In;
R represents at least one element selected from the group consisting of Ca, Mg, K, and Na;
I represents one or two elements selected from the group consisting of O and S;

$0 \leq a < 0.5$ and $0 \leq a' < 0.2$;

$0 \leq b \leq 0.2$ and $0 \leq b' < 0.4$;

$0 \leq c \leq 0.05$ and $0 \leq d \leq 0.99$;

$0 \leq e \leq 1$ and $f \leq 0.1$;

$0.09 \leq x \leq 0.13$ and $0.002 \leq y \leq 0.7$;

$0.0001 \leq z \leq 0.01$; and subscripts b, d, e, x and y are such that the alloy further satisfies:

$6.143b(13(1-x))+4.437y[1-0.0614(d+e)] \geq 1$;

$d \times y \geq 0.005$;

casting the precursor and solidifying the precursor in ingot form;
optionally, carrying out an electroslag remelting or vacuum remelting;
comminuting the ingot into a powder of particles,
carrying out a homogenizing heat treatment with air or under blanket gas on the alloy either just before, or just after the comminuting, and
carrying out a diffusion treatment on the powder with at least one element selected from the group consisting of carbon, hydrogen, and nitrogen, to obtain an alloy powder having a composition according to claim 1.

11. The method for fabricating an alloy powder according to claim 10, comprising:
casting and solidifying the precursor in ingot form, further comprising at least one of the group consisting of:
maintaining the freshly solidified ingot at a temperature above 1300° C. but lower than the melting point, for less than 24 hours;
carrying out an electromagnetic agitation during the ingot casting and during the solidification; and
heating the ingot after its first solidification to a temperature above 1300° C. so that it returns at least partially to liquid state, and then solidifying it again;
comminuting the ingot into a powder of particles; and
carrying out a diffusion treatment on the powder with at least one element selected from the group consisting of carbon, hydrogen, and nitrogen, to obtain an alloy powder having a final target composition.

12. The method for fabricating an alloy powder according to claim 10, comprising:
comminuting the ingot into a powder of particles having a size smaller than 10 mm;
carrying out a fine comminution and homogenizing treatment in hydrogen at a temperature lower than 300° C. to obtain a powder of particles having a size smaller than 1000 μm;
carrying out a diffusion treatment on the powder at a temperature lower than 400° C., with at least one element selected from the group consisting of carbon, hydrogen, and nitrogen, to obtain an alloy powder having a final target composition.

13. The method for fabricating a powder of an alloy according to claim 1, comprising:
preparing a precursor of the alloy comprising:

$(La_{1-a-a'}Mm_aTR_{a'})_1[(Fe_{1-b-b'}CO_bM_{b'})_{1-x}(Si_{1-c}X_c)_x]_{13}(C_dN_eH_{1-d-e})_y(R)_z(I)_f$ wherein Mm represents a mixture of lanthanum, cerium, neodymium, and praseodynium, in the weight proportion of 22 to 26% La, 48 to 53% Ce, 17 to 20% Nd, and 5 to 7% Pr, said mixture comprising up to 1% by weight of impurities,
TR represents at least one rare earth family element other than lanthanum;
M represents at least one type d transition element of the 3d, 4d, or 5d layers;
X represents a metalloid element selected from the group consisting of Ge, Al, B, Ga, and In;
R represents at least one element selected from the group consisting of Ca, Mg, K, and Na;
I represents one or two elements selected from the group consisting of O and S;

$0 \leq a < 5$ and $0 \leq a' < 0.2$;

$0 \leq b \leq 0.2$ and $0 \leq b' < 0.4$;

$0 \leq c \leq 0.05$ and $0 \leq d \leq 0.99$;

$0 \leq e \leq 1$ and $f \leq 0.1$;

$0.09 \leq x \leq 0.13$ and $0.002 \leq y \leq 0.7$;

$0.0001 \leq z \leq 0.01$;

subscripts b, d, e, x and y are such that the alloy further satisfies:

$6.143b(13(1-x))+4.437y[1-0.0614(d+e)] \geq 1$;

$d \times y \geq 0.005$;

atomizing the precursor in molten form, without prior solidification, to obtain a powder of particles; and
carrying out a diffusion treatment on the powder with at least one element selected from the group consisting of carbon, hydrogen, and nitrogen, to obtain an alloy powder having a final target composition.

14. The method for fabricating an alloy according to claim 1, comprising:
preparing a precursor of the alloy comprising:

$(La_{1-a-a'}Mm_aTR_{a'})_1[(Fe_{1-b-b'}CO_bM_{b'})_{1-x}(Si_{1-c}X_c)_x]_{13}(C_dN_eH_{1-d-e})_y(R)_z(I)_f$ wherein Mm represents a mixture of lanthanum, cerium, neodymium, and praseodynium, in the weight proportion of 22 to 26% La, 48 to 53% Ce, 17 to 20% Nd, and 5 to 7% Pr, said mixture comprising up to 1% by weight of impurities;
TR represents at least one rare earth family element other than lanthanum;
M represents at least one type d transition element of the 3d, 4d, or 5d layers;
X represents a metalloid element selected from the group consisting of Ge, Al, B, Ga, and In;
R represents at least one element selected from the group consisting of Ca, Mg, K, and Na;
I represents one or two elements selected from the group consisting of O and S;

$0 \leq a < 0.5$ and $0 \leq a' < 0.2$;

$0 \leq b \leq 0.2$ and $0 \leq b' < 0.4$;

$0 \leq c \leq 0.05$ and $0 \leq d \leq 0.99$;

$0 \leq e \leq 1$ and $f \leq 0.1$;

$0.09 \leq x \leq 0.13$ and $0.002 \leq y \leq 0.7$;

$0.0001 \leq z \leq 0.01$;

subscripts b, d, e, x and y are such that the alloy further satisfies:

$6.143b(13(1-x))+4.437y[1-0.0614(d+e)] \geq 1$;

$d \times y \geq 0.005$;

solidifying the precursor in form of a strip, wire, or powder of particles by overhardening; and
carrying out a diffusion treatment on said strip, wire, or powder with at least one element selected from the group consisting of carbon, hydrogen, and nitrogen, to obtain an alloy strip, wire or powder having a final target composition.

15. A powder of Fe—Si—La alloys according to claim 1, comprising at least two different alloys $A_1$ and $A_2$, selected so that the transition temperatures, $Ttr_1$ of $A_1$, and $Ttr_2$ of $A_2$, and the peak widths at mid-height, $\Delta T_{LMH1}$ of $A_1$, and $\Delta T_{LMH2}$ of $A_2$, of respective curves of variation in magnetic entropy, $\Delta S_{m1}(T)$ of $A_1$, and $\Delta S_{m2}(T)$ of $A_2$, are such that respective working zones, $Ttr_1-\Delta T_{LMH1}$ and $Ttr_1+\Delta T_{LMH1}$ of $A_1$, and, $Ttr_2-\Delta T_{LMH2}$ and $Ttr_2+\Delta T_{LMH2}$ of $A_2$, overlap.

16. The alloy powder according to claim 15, in which the at least two different alloys, $A_1$ and $A_2$, are obtained from a same precursor material P subjected to at least two different diffusion treatments of at least one element selected from the group consisting of carbon, hydrogen, and nitrogen.

17. The method as defined in claim 10, wherein the precursor comprises:

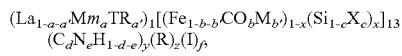
$(La_{1-a-a'}Mm_a TR_{a'})_1[(Fe_{1-b-b'}Co_b M_{b'})_{1-x}(Si_{1-c}X_c)_x]_{13}$
$(C_d N_e H_{1-d-e})_y (R)_z (I)_f$, wherein Mm represents a mixture of lanthanum, cerium, neodymium, and praseodynium, in the weight proportion of 22 to 26% La, 48 to 53% Ce, 17 to 20% Nd, and 5 to 7% Pr, said mixture comprising up to 1% by weight of impurities;

TR represents at least one rare earth family element other than lanthanum;

M represents at least one type d transition element of the 3d, 4d, or 5d layers;

X represents a metalloid element selected from the group consisting of Ge, Al, B, Ga, and In;

R represents at least one element selected from the group consisting of Ca, Mg, K, and Na;

I represents one or two elements selected from the group consisting of O and S;

$0 \leq a < 0.5$ and $0 \leq a' < 0.2$;

$0 \leq b \leq 0.2$ and $0 \leq b' < 0.4$;

$0 \leq c \leq 0.05$ and $0 \leq d \leq 0.99$;

$0 \leq e \leq 1$ and $f \leq 0.1$;

$0.09 \leq x \leq 0.13$ and $0.002 \leq y \leq 0.7$;

$0.0001 \leq z \leq 0.01$; and subscripts b, d, e, x and y are such that the alloy further satisfies:

$6.143b(13(1-x))+4.437y[1-0.0614(d+e)] \geq 1$; and $d \times y \geq 0.005$.

18. A method of manufacturing refrigerating equipment, comprising fabricating at least one part of the refrigerating equipment from the alloy according to claim 1.

19. A method of manufacturing a heat pump, comprising fabricating at least one part of the heat pump from the alloy according to claim 1.

20. A method of manufacturing refrigerating equipment or a heat pump, comprising fabricating at least one part of the refrigerating equipment or the heat pump from the powder according to claim 8.

21. The Fe—Si—La alloy of claim 1, wherein X represents a metalloid element selected from the group consisting of Ge, B, Ga, and In.

22. The Fe—Si—La alloy of claim 1, comprising an effective amount of the at least one element selected from the group consisting of Al, Ca, Mg, K, and Na to hinder oxidation of the rare earth elements during electric arc melting or induction melting of the alloy.

* * * * *

UNITED STATES PATENT AND TRADEMARK OFFICE
CERTIFICATE OF CORRECTION

PATENT NO.        : 8,808,468 B2                                         Page 1 of 1
APPLICATION NO.   : 12/747657
DATED             : August 19, 2014
INVENTOR(S)       : Thierry Waeckerle et al.

It is certified that error appears in the above-identified patent and that said Letters Patent is hereby corrected as shown below:

On the title page item [73] should read:

[73]   Assignees:   CENTRE NATIONAL DE LA RECHERCHE SCIENTIFIQUE, Paris (FR)
                    APERAM ALLOYS IMPHY, Saint Denis (FR)

Signed and Sealed this
Twenty-ninth Day of September, 2015

Michelle K. Lee
*Director of the United States Patent and Trademark Office*